(12) United States Patent
Schon et al.

(10) Patent No.: US 7,748,622 B2
(45) Date of Patent: Jul. 6, 2010

(54) DIRECT CUSTOMER ERP ACCESS

(75) Inventors: Bjarne Schon, Noerum (DK); Erik Dibbern Röser, Hillerod (DK); Hans Gufler, Herlev (DK); Kristian Torning, Copenhagen (DK); Pontus Holm, Furulund (SE); Thomas Rath, Slangerup (DK)

(73) Assignee: Microsoft Corporation, Redmond, WA (US)

( * ) Notice: Subject to any disclaimer, the term of this patent is extended or adjusted under 35 U.S.C. 154(b) by 1133 days.

(21) Appl. No.: 11/393,032

(22) Filed: Mar. 30, 2006

(65) Prior Publication Data

US 2007/0228163 A1    Oct. 4, 2007

(51) Int. Cl.
G06K 15/00    (2006.01)
(52) U.S. Cl. .................. 235/383; 235/382; 235/380
(58) Field of Classification Search .......... 235/380, 235/382.5, 382, 383
See application file for complete search history.

(56) References Cited

U.S. PATENT DOCUMENTS

| | | | |
|---|---|---|---|
| 5,900,875 A | 5/1999 | Haitani et al. | 345/349 |
| 2001/0032154 A1 | 10/2001 | Schummer | 705/30 |
| 2001/0044751 A1 | 11/2001 | Pugliese, III et al. | 705/26 |
| 2002/0005775 A1 | 1/2002 | Sonnendorfer et al. | 340/5.91 |
| 2002/0188486 A1 | 12/2002 | Gil et al. | 705/7 |
| 2003/0090722 A1 | 5/2003 | Eller et al. | 358/1.17 |
| 2003/0182195 A1 | 9/2003 | Kumar | 705/26 |
| 2004/0103046 A1 | 5/2004 | Christoph et al. | 705/28 |
| 2004/0199541 A1 | 10/2004 | Goldberg et al. | 707/104.1 |
| 2005/0154646 A1 | 7/2005 | Chermesino | 705/26 |
| 2005/0160403 A1 | 7/2005 | Nivelet | 717/116 |
| 2005/0269402 A1* | 12/2005 | Spitzer et al. | 235/380 |

OTHER PUBLICATIONS

"mySAP ERP: SAP Employee Self-Service," available at www.sap.com/solutions/business-suite/erp/employeeselfservice.epx (1 page).
"NetERP," copyrighted 2005, available at www.netsuite.com/portal/products/neterp/main.shtml (1 page).

* cited by examiner

*Primary Examiner*—Karl D. Frech
(74) *Attorney, Agent, or Firm*—Marshall, Gerstein & Borun LLP

(57) ABSTRACT

To improve upon existing ERP and other business logic handling system implementations, the claimed system and method provides direct customer access to functionality and data available in a merchant's business logic handling system. The claimed method and system includes installing functions of the business logic handling system at a portable computing device provided by the merchant or owned by a customer, and downloading data corresponding to functions installed at the portable computing device. The customer inputs requests to perform functions of the business logic handling system, and the functions are performed at the portable computing device and/or a system server, and the output of the function is displayed to the custom at the device.

20 Claims, 6 Drawing Sheets

DIRECT CUSTOMER ERP ACCESS

BACKGROUND

Enterprise resource planning (ERP) systems are management information systems (MISs) that integrate and automate many of the business practices and functions associated with the operations or production and distribution aspects of a company engaged in manufacturing and/or selling products or services. ERP systems typically handle manufacturing, logistics, distribution, inventory, shipping, invoicing, and accounting functions for a company, and ERP software can aid in the control of many business activities, like sales, delivery, billing, production, inventory management, quality management, and human resources management. ERP systems are often called "back office" systems, indicating that customers and the general public are not directly involved in the operation of the ERP system.

As an example, an ERP system may, along with other functionality, track the availability, movement and sale of goods for a manufacturer or retailer. The ERP system may store information relating to the location of goods within one or more facilities, within departments, such as receiving, shipping and warehousing, within a facility, and within individual storage locations within each facility. In addition to quantity information, the ERP system may track the availability of the goods within the facilities for sale to customers. For example, the ERP system may reserve a quantity of the goods at a particular facility when a sales order is received from a customer, and may reserve a quantity of goods in a particular storage location within the facility to be used to fill the sales order when the ERP system schedules the order fulfillment activities, such as item-picking, order consolidation and shipping, to be performed at the facility the following day. As the order fulfillment activities are performed, the ERP system may reduce the on-hand inventory and reserved inventory of the storage locations and the facility to reflect the completion of the sales transaction. In the case of a retail facility, the ERP system may adjust the inventory available on the display floor and at the retail facility when the customer makes a purchase at a point-of-sale terminal.

In some implementations, ERP systems are used by retailers to support the activities of the sales associates in their stores to assist customers in finding and purchasing products offered by the retailer. The customers are dependent on sales associates for obtaining information contained within the retailer's ERP system. For example, a customer shopping for a pair of jeans must interact with a sales associate that will in turn perform an inventory look up in the retailer's ERP system to determine whether a particular size and style of jeans are available in the storage area or at another retail location if the customer could not find the jeans in the display area of the store. Once the jeans sought by the customer are located in the ERP system, either at the store, at another retail location, at a warehouse facility, or at the jeans vendor's facility, the customer then further interacts with the same or another sales associate to perform the sales transaction for the jeans in the ERP system.

SUMMARY

ERP systems and other business logic handling systems may be configured to make a portion of the functions and information of the systems directly accessible to the customer end users. The customer may be allowed to operate a sub-set of the functionality to which normally only the hired employees of the system owner have access. The functions to which the customers may be provided with direct access may be installed at a portable computing device provided by the system owner or owned by the customer. Data of the system corresponding to the functions installed that the portable computing device may also be downloaded to the portable computing device. The customer may input requests at the portable computing device for the performance of functions of the system that are installed at the portable computing device. The portable computing device may execute the requested function and, if necessary, transmit a request to a system server to execute a requested function and/or retrieve requested system data, and the system server may transmit a response message with the requested information. After the request is processed, the outcome of the executed function may be displayed to the customer at the portable computing device.

DRAWINGS

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
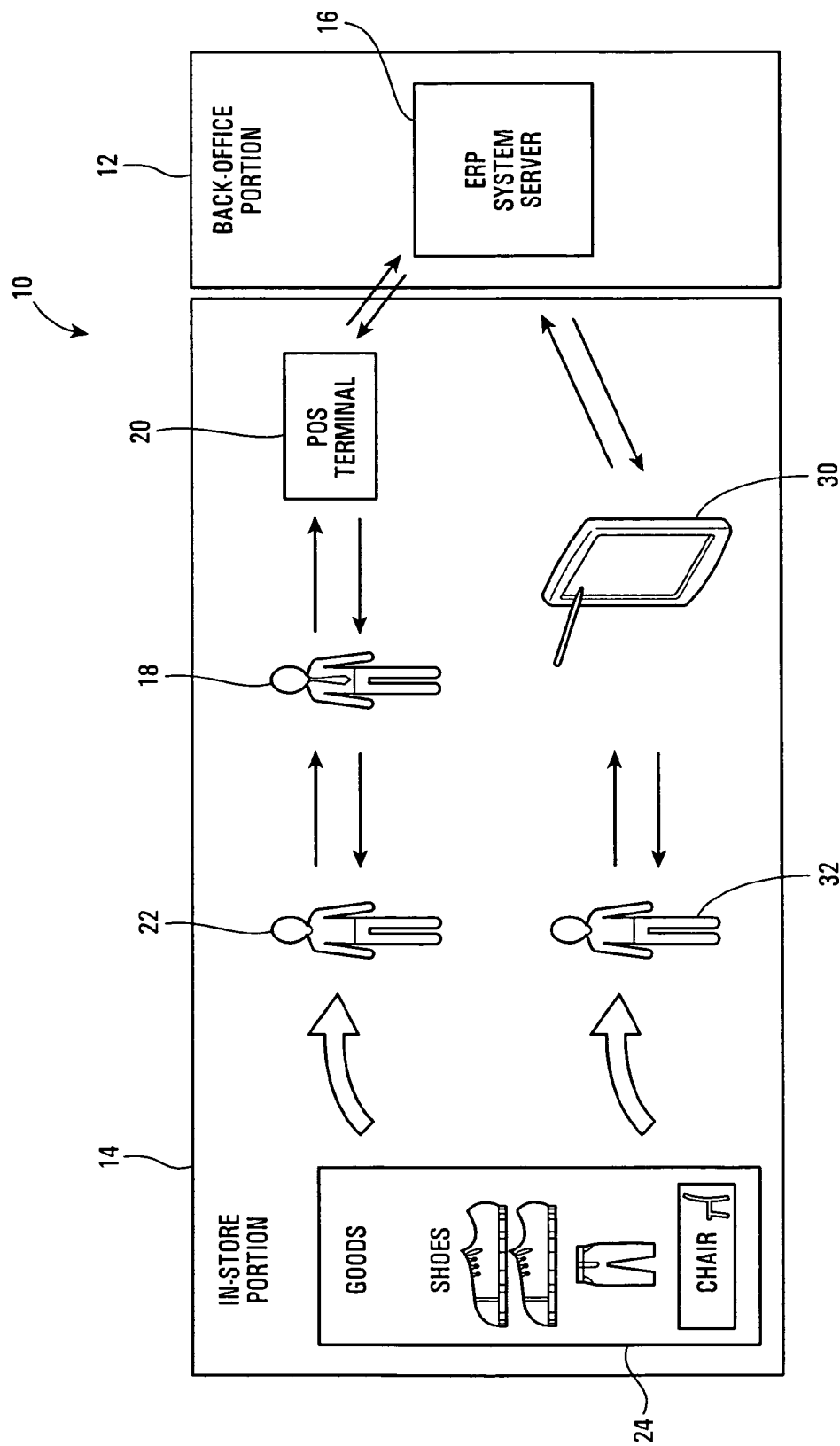
FIG. 1 is a diagram of a merchant ERP system incorporating direct customer ERP access in accordance with the claims.

FIG. 1 illustrates an example of a merchant ERP system 10 implementing direct customer ERP access in accordance with the claims. The merchant ERP system 10 may include a back-office portion 12 wherein traditional ERP functions are performed by authorized users, and an in-store portion 14 wherein the typical ERP functions necessary for the merchant's sales associates to service the customers at the point-of-sale are provided, along with direct access functionality for the customers as discussed further below. The back-office portion 12 may include the merchant's ERP system server 16 as well as other components of the ERP system 10 that provide the ERP functionality and interfaces for the in-store portion 14 of the ERP system 10 to support the retail functions of the store. The ERP system 16 may be any commercially available ERP software product, such as Microsoft Axapta®, Microsoft Navision®, mySAP ERP®, and the like, or a custom developed ERP application that may be configured to provide the direct customer access functionality discussed herein. While the term ERP system is used herein, those skilled in the art will understand that direct customer access as discussed herein may be implemented with any backend business logic handling system or other MIS that integrates and automates business practices and functions associated with the operations or production and distribution aspects of a company engaged in manufacturing and/or selling products or services.

As discussed, the in-store portion 14 of the merchant ERP system 10 may include a combination of traditional sales associate accessed point-of-sale functionality and direct customer functionality for accessing the information and interfacing with the merchant ERP system 10. In order to provide authorized access to the ERP system server 16 by the sales associates 18, the in-store portion 14 may include one or more point-of-sale terminals 20 operatively connected to the ERP system server 16 in the back-office portion 12. The point-of-sale terminals 20 may be cash registers or other computing devices typically used by retail sales associates in servicing retail customers 22 and performing the necessary in-store ERP functions, and may include any other device for receiving input necessary for executing payment transactions, such as payment by phone, fingerprint identification, etc. The point-of-sale terminals 20 may be operatively coupled to the ERP system server 16 using any appropriate communication media including wired media such as a wired network word direct wired connection, and wireless media such as acoustic, RF, infrared and other wireless media. When a customer 22 approaches the sales associate 18 with an inquiry about the goods 24 offered by the merchant, or to purchase goods 24, such as shoes, blue jeans, furniture, or other goods offered by the merchant, the sales associate 18 may access the in-store ERP functions available at the point-of-sale terminal 20 necessary to assist the customer 22.

In addition to the point-of-sale terminals 20, the in-store portion 14 of the ERP system 10 may include portable computing devices (PCDs) 30 configured to communicate with the ERP system server 16 to provide customers 32 with direct access to portions of the functionality of the ERP system 10 that are provided by the merchant to assist the customers 32 in their shopping experience at the store. Depending on the implementation of the merchant ERP system 10, the portable computing devices 30 may be provided by the merchant to the customers 32 for use while the customers 32 are in the store, or the portable computing devices 30 may be devices owned by the customer 32, such as PDAs, cell phones, MP3 players or other portable devices capable of communicating with the ERP system server 16 using wired communications and/or wireless communications, such as WiFi, Bluetooth, infrared, RF or other wireless technologies, and to which customer access ERP application programs and associated data may be transmitted, stored and executed. Using either a merchant-supplied or personal portable computing device 30, the customer 32 may input information into the customer access ERP applications at the device 30, and have the device 30 process the information and/or communicate with the ERP system server 16, if necessary, to assist the customer during their shopping experience. Examples of ERP applications to which the customer 32 may be provided direct access include inventory inquiry functions for the retail location where the customer 32 is shopping, other retail locations of the merchant, and warehouse locations, merchandise transfer and back ordering functions, reservation functions for temporarily holding merchandise at other retail locations, purchasing functions and scheduling direct shipment of purchased merchandise. Of course, those skilled in the art will understand that any ERP functionality to which the merchant desires to provide direct access for the customers 32 may be downloaded to the portable computing devices 30.

Figure 2:
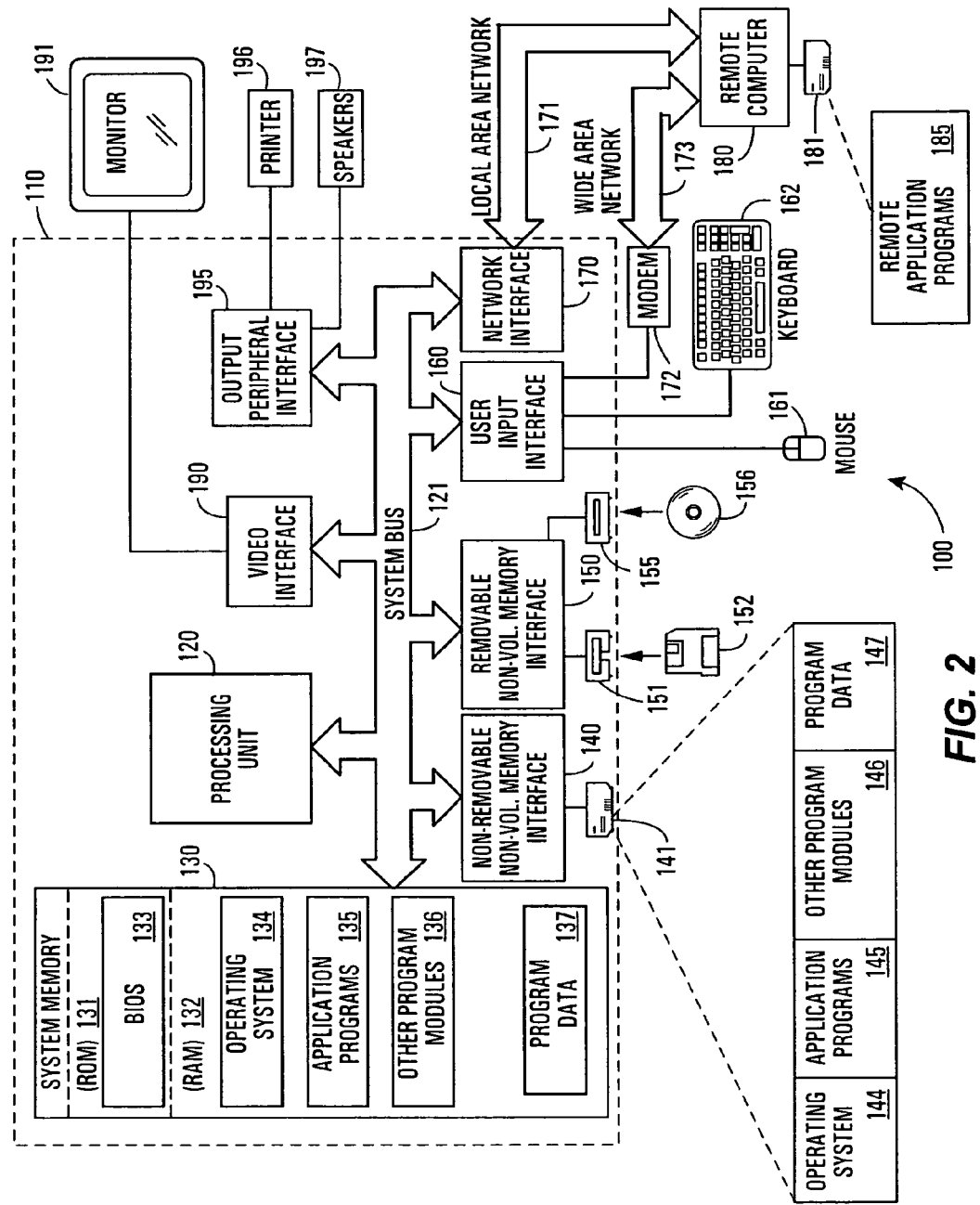
FIG. 2 is a block diagram of a computing system that may operate in accordance with the claims.

FIG. 2 illustrates an example of a suitable computing system environment 100 on which the back-office portion 12 of the ERP system 10, and the steps of the claimed method and apparatus, may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, implantable devices, multiprocessor systems, microprocessor-based systems, nanotechnology devices and/or systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 2, the exemplary system for implementing the ERP system 16, the steps of the claimed method, and claimed apparatus may include the ERP system server 16 implemented in a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus, nanotechnology semiconductors and any other known or later-developed communication appliances.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, SDRAM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone with accompanying voice recognition software, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190, and may be a CRT display, LCD screen, plasma screen, touchscreen that may have an accompanying stylus, or any other appropriate display device. In addition to the monitor, computers may also include other peripheral output devices such as speakers 197 and printer 196, which may be connected through an output peripheral interface 195.

The computer 110 may operate in a networked environment with the other components of the ERP system 10 in the same location and, depending on the implementation, in remote locations, using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. For example, a point-of-sale terminal 20 may be remote computers 180 connected to the computer 110 in the networked environment. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Figure 3:
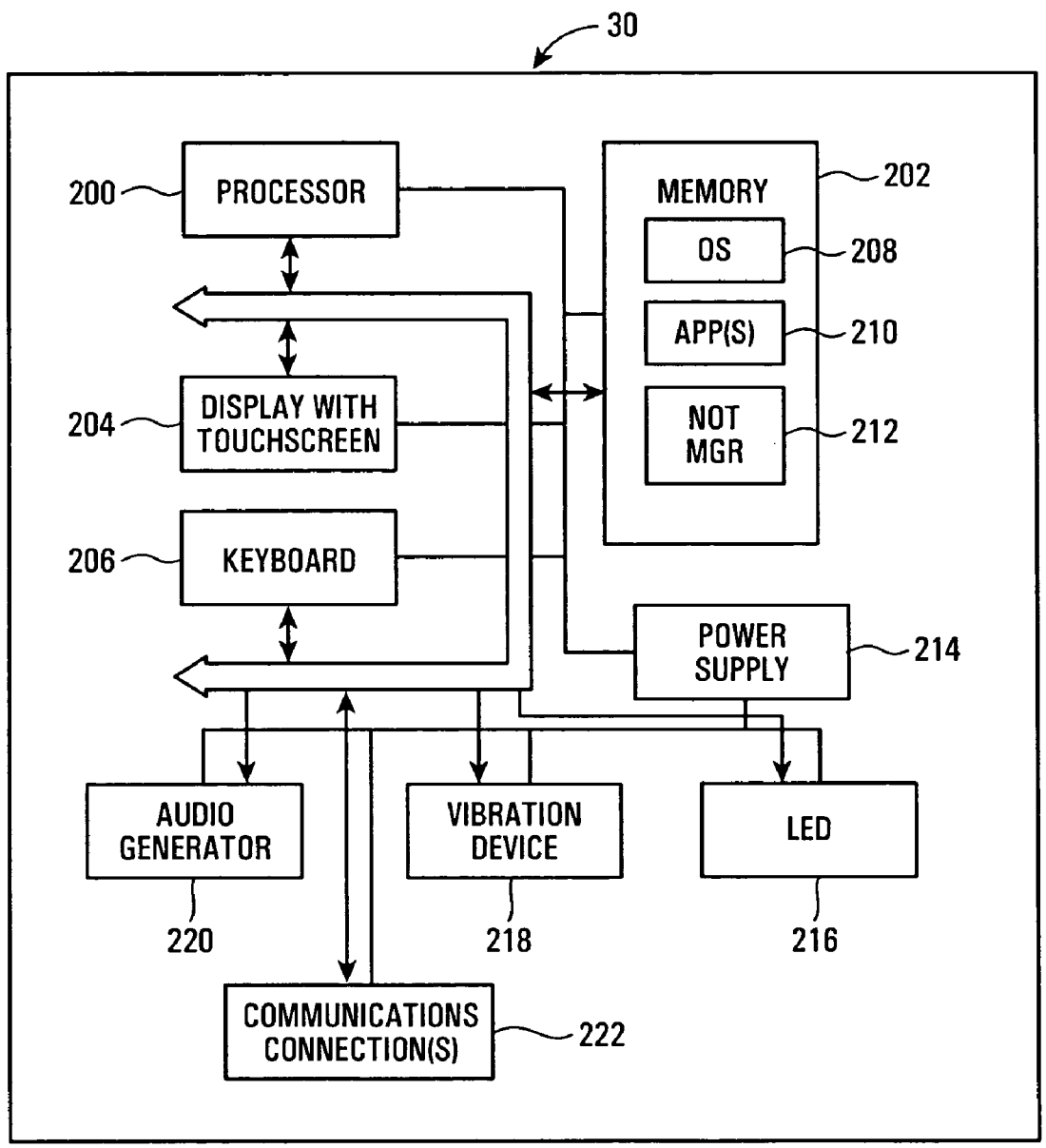
FIG. 3 is a block diagram of a portable computing device that may operate in accordance with the claims.

FIG. 3 shows functional components of an embodiment of the portable computing device 30 that may be used at the in-store portion 14 of the merchant ERP system 10. As discussed, the portable computing device 30 may be a PDA or other device provided by the merchant, or a PDA, cell phone or other device owned by the customer. Further, the portable computing device 30 may be a handheld device, or may be wearable or, in more advanced applications, an implanted device responsive to wireless communications and to sensory input from the individual in which the device is implanted. The portable computing device 30 may include a processor 200, a memory 202, a display 204, and a keyboard 206 or other pushbutton input devices. The memory 202 generally includes both volatile memory (e.g., RAM) and non-volatile memory (e.g., ROM, PCMCIA cards, etc.), and may include both non-removable and removable computer storage media such as, where appropriate, those described above or the computer 110, as well as SIM cards for cellular phones. The displayed 204 may be any portable computing device display, such as an LCD screen, plasma screen, touchscreen with stylus or other appropriate display device. An operating system 208 is resident in the memory 202 and executes on the processor 200. The portable computing device 30 includes an operating system, such as the Windows® CE operating system from Microsoft Corporation or other operating system.

One or more application programs 210 are loaded into memory 202 and run on the operating system 208. Examples of applications include email programs, scheduling programs, PIM (personal information management) programs, word processing programs, spreadsheet programs, Internet browser programs, and so forth along with the customer access ERP applications discussed herein. The portable computing device 30 also has a notification manager 212 loaded in memory 202, which executes on the processor 200. The notification manager 212 handles notification requests from the applications 210.

The portable computing device 30 has a power supply 214, which may be implemented as one or more batteries or other internal power source, such as hydrogen cells. The power supply 214 might further or alternatively include an external power source that overrides or recharges the built-in batteries, such as an AC adapter or a powered docking cradle.

The portable computing device 30 is also shown with three types of external notification mechanisms: an LED 216, a vibration device 218, and an audio generator 220. These devices are directly coupled to the power supply 214 so that when activated, they remain on for a duration dictated by the notification mechanism 212 even though the portable computing device processor 200 and other components might shut down to conserve battery power. The LED 216 preferably remains on indefinitely until the user takes action. The current versions of the vibration device 218 and audio generator 220 use too much power for today's portable computing device batteries, and so they are configured to turn off when the rest of the system does or at some finite duration after activation.

The portable computing device 30 may also contain communications connection(s) 222 that allow the device to communicate with other devices, such as the merchant's in-store POS terminals 20 and the merchant ERP system server 16. Communications connection(s) 222 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, USB port, a serial port for connecting to an interface cradle, and the like, and wireless media such as acoustic, RF, infrared and other wireless media. The term computer readable media as used herein includes both storage media and communication media.

Figure 4:
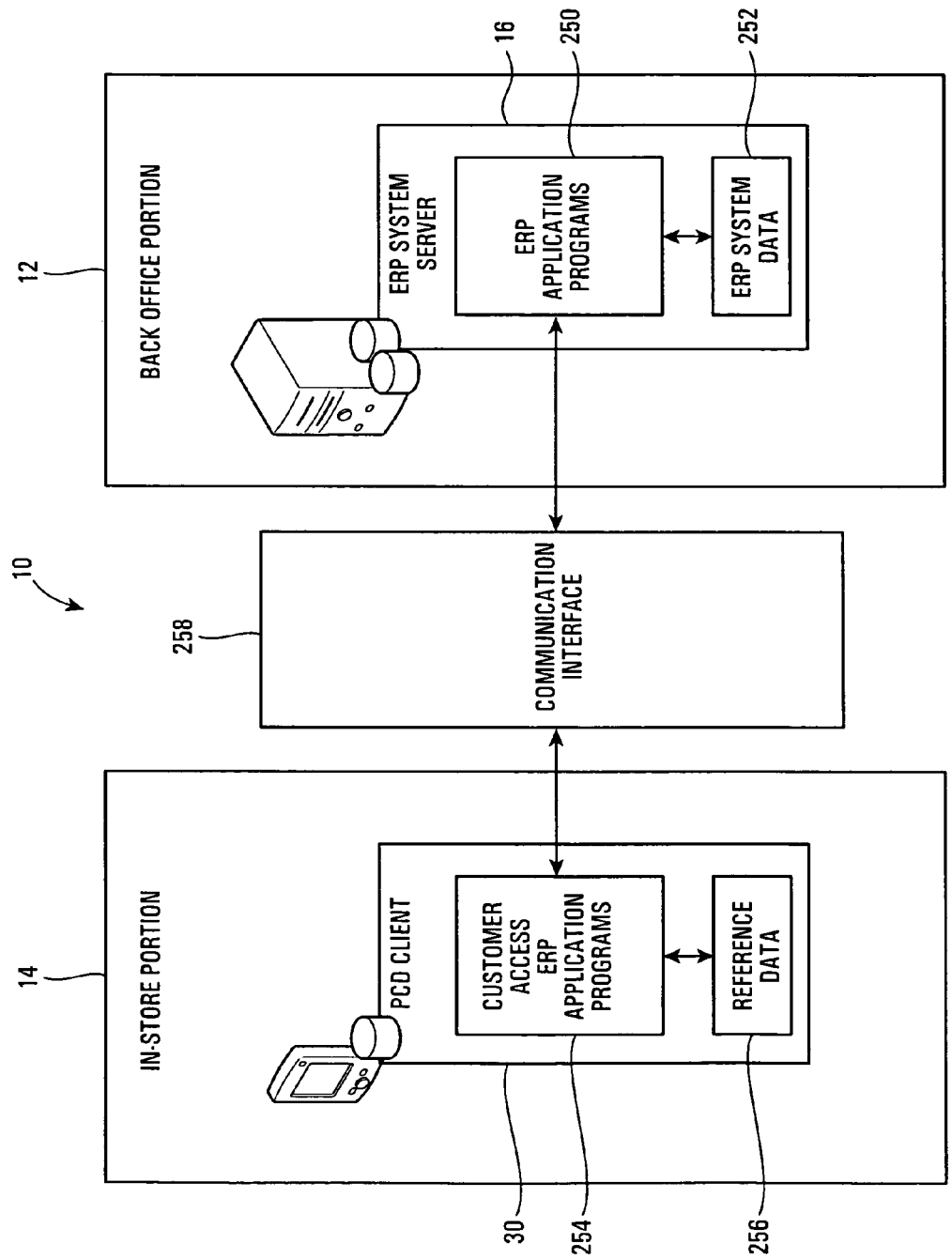
FIG. 4 is a functional block diagram of components of the merchant ERP system of FIG. 1.

FIG. 4 illustrates a functional block diagram of an embodiment of a system architecture for the merchant ERP system 10 of FIG. 1. The back-office portion 12 of the merchant ERP system 10 may be implemented in a suitable computing system environment such as the computing system environment 100 of FIG. 2. As previously discussed, the ERP system 16 may be implemented using any appropriate commercially available or custom designed ERP software come or any other packaged, modified or custom backend business logic handling system supporting the retail functions of the merchant. Among other components in the back-office portion 12 of the ERP system 10, the ERP system server 16 is provided to perform some or all of the functions of the ERP system 10, and in particular to support the functions performed at the in-store portion 14 of the ERP system 10. The ERP system server 16 may include ERP application programs 250 stored in system memory 130 and executable by the processing unit 120 of the server 16. The ERP application programs 250 may include programs for performing the traditional ERP functions of the ERP system 10, and programs configured to support the functions performed at the in-store portion 14 of the ERP system 10, and in particular the customer access functions provided at the portable computing devices 30. For example, the ERP application programs 250 may include programs or subroutines controlling the transmitting and updating of the customer access ERP application programs transmitted to the portable computing devices 30, for processing request from the portable computing devices 30 requiring information that typically downloaded to the portable computing devices 30, and otherwise supporting the ERP functions to which the customers will have access via the customer access ERP application programs. The application programs 250 made be provided by the same software vendor, or may be compiled and integrated from different software vendors, and may include custom-developed software applications.

The ERP system server 16 may further include the ERP system data 252 necessary for the ERP system server 16 to perform the functions of the ERP application programs 250. The ERP system data 252 may include the functional data of the ERP system 10, such as item information, inventory information, pricing information, vendor information, and the like, and technical data necessary to control the operation and execution of the ERP system 10. The ERP system data 252 may be stored at the ERP system server 16 as illustrated such as on the hard disk drive 141 shown in FIG. 2, or may be stored at a remote storage device, such as the remote computer 180, and accessible to the ERP system server 16 and the other components of the ERP system 10 over the LAN 171, WAN 173 or other network of the ERP system 10.

As discussed previously, depending on the implementation, the portable computing device 30 may be provided by the merchant or may be a customer-owned portable computing device. When used to perform customer access ERP functions at the in-store portion 14 of the ERP system 10, the portable computing device 30 may store customer access ERP application programs 254 and reference data 256 of the ERP system 10 in memory 202 of the device 30. The customer access ERP application programs 254 may include any level of ERP functionality desired by the merchant to be provided to their customers for access to the information of the ERP system 10. These functions may range from product description, in-store location and inventory level information access, to access to inventory information for other stores and warehouses, to item reservation, inventory back ordering and shipping functions, and to item check out and purchasing. Moreover, the application programs 254 may perform background processing functions, such as tracking of items for which the customer has made an inquiry or purchase, identifying additional items that may be related to or substitutes for items purchased or inquired upon by the customer, and controlling communications between the portable computing device 30 and the ERP system server 16. As discussed further below, the customer access ERP application programs 254 may be preloaded into merchant-provided portable computing devices 30, or may be downloaded to a customer-owned portable computing device 30 when the customer enters the store, or when a customer subscribes to the in-store customer access ERP system, if required.

In order to support the functions offered by the customer access ERP application programs 254, the portable computing device 30 may store reference data 256 that has been downloaded from the ERP system server 16. The reference data 256 may include the portion of the ERP system data 252 necessary to perform the customer access ERP applications at the particular store location. For example, the reference data 256 may include information relating to the goods typically offered for sale and stocked at a particular store, the current inventory information for each of the goods offered at the store, store layout and item location information, and the like. If additional information is required from the ERP system data 252, the customer access ERP application programs 254 may include the necessary functionality to request such information from the ERP system server 16. Moreover, it may be desired to ensure that the reference data 256 stored at the portable computing device 36 and the ERP system data 252 at the ERP system server 16 are up to date to reflect recent activity within the ERP system 10. Consequently, the customer access ERP application programs 254 and ERP application programs 250 may include functionality for periodically exchanging transaction data, updated inventory information, and the like between the ERP system server 16 and the portable computing devices 30 with a desired frequency.

To facilitate communications between the ERP system server 16 and the portable computing devices 30, the merchant ERP system 10 may further include a communications interface 258 facilitating the communications between the back-office portion 12 and the in-store portion 14. The communications interface 258 may be any appropriate communications device necessary for transferring information between the ERP system server 16 and the portable computing devices 30. For example, in a small-business implementation where the merchant has a single location with a retail storefront and a warehousing facility in another portion of the building, the communications interface 258 may be an RF transmitter/receiver card installed in the ERP system server 16 incapable of exchanging information with portable computing devices 30 having compatible RF capabilities. In another example wherein a large merchant may have multiple retail locations and multiple distribution centers operating together within the ERP system 10, the communications interface 258 may be a wireless Internet router connected to the ERP system server 16 disposed at a remote location via a T1 line, DSL connection, cable modem, digital satellite input, or the like and may be able to transmit messages to and receive messages from multiple portable computing devices 30 within a particular store location. Other communications interfaces 258 capable of facilitating the exchange of information between the ERP system server 16 and a portable computing devices 30 will be apparent to those skilled in the art and are contemplated by the inventors as having use in the methods and apparatus recited in the claims.

Figure 5:
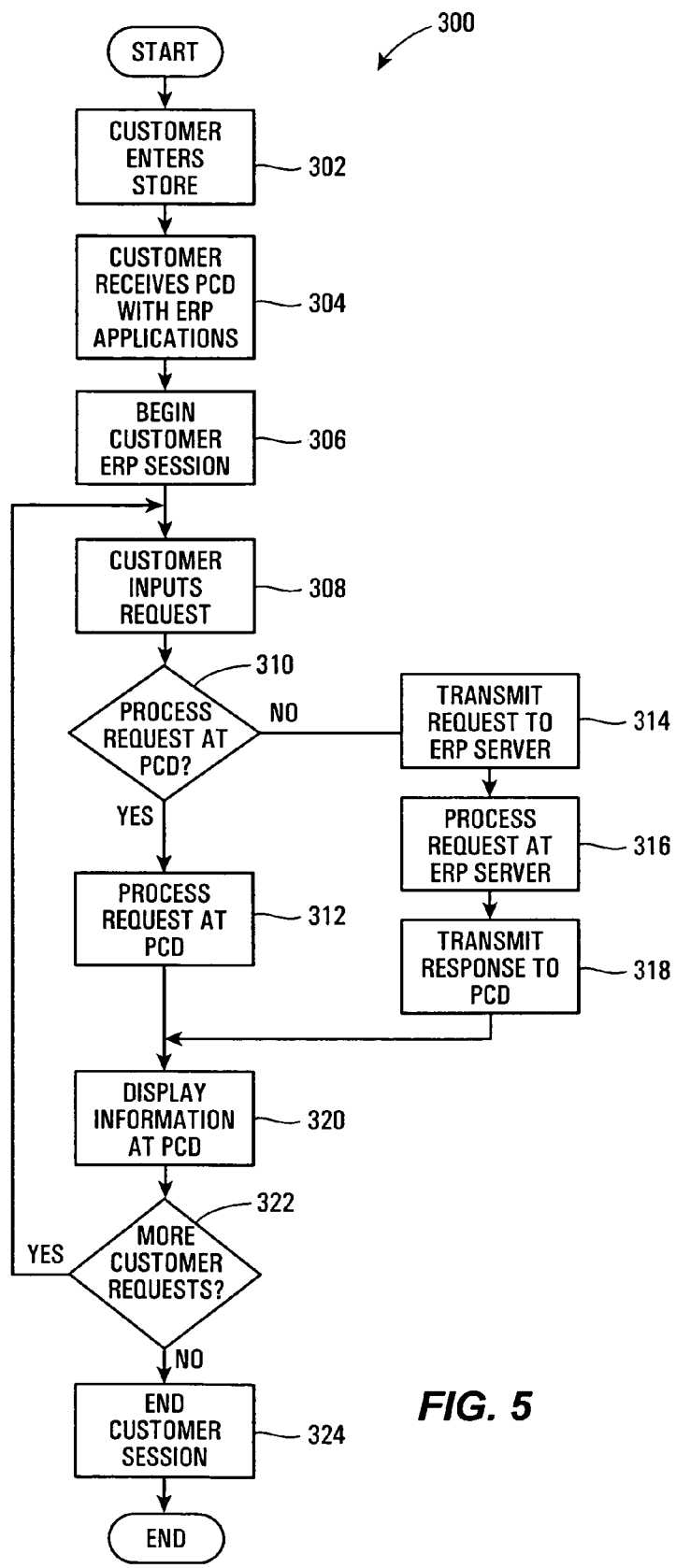
FIG. 5 is a flow diagram for a customer shopping routine for the merchant ERP system of FIG. 1 with merchant-provided portable computing devices.

FIG. 5 illustrates an exemplary process flow routine 300 for a customer's purchasing experience at a retail location wherein portable computing devices 30 are provided by the merchant to the customers 32 for use while shopping. The routine 300 begins when the customer 32 enters the store at a block 402, and receives a portable computing device 30 having the customer access ERP application programs 254 loaded thereon. The merchant's may desire to monitor the usage of the portable computing devices 30 by the customer 32, or to provide a threshold level of control of access to the ERP functionality available to the customer. In such implementations, the routine 300 may pass to a block 306 wherein an ERP application program 254 may cause the device 30 to display a login screen, and a customer 32 may begin the ERP session by entering the requested information. In some applications, the merchant may request that the customer 32 enter their name and address, and possibly a customer identification number, for the purposes of identifying the customer 32 that is using the ERP system, and collecting information relating to the customer's activities during the session for use in future targeted marketing efforts.

As previously discussed, it may be desired to ensure that the portable computing device 30 has current ERP system data 252 stored as reference data 256. Consequently, the application programs 254 may include logic to update the reference data 256 stored at the portable computing device 30 when the customer 32 begins their ERP session at block 306. The initiation of the session by the customer 32 may cause the portable computing device 30 to transmit a request message to the ERP system server 16 for up-to-date reference data 256 from the ERP system data 252. Upon receiving the request, the ERP system server 16 may retrieve the necessary data from the ERP system data 252 for the store location, and transmit a response message to the portable computing device 30 with the information to be used to update the reference data 256. Other strategies for updating the reference data 256 in a timely manner will be apparent to those skilled in the art. For example, before a portable computing device 30 is given to a customer 32 at block 304, a sales associate may initiate a download of current ERP system data 252 to be stored as reference data 256 in the device 30, such as by initiating a synchronization function provided by the application programs 254 to request up-to-date information from the ERP system server 16 via wireless communications, via a serial port of the portable computing device 30 attached to a corresponding cradle provided by the communications interface 258, or by any other means for affecting the data request and transfer. As a further alternative, the ERP application programs 250 of the ERP system server 16 may be configured to periodically retrieve and transmit the required ERP system data 252, and the application programs 254 at the portable computing device 30 may be configured to receive the messages broadcast by the ERP system server 16, either continuously or during the course of a customer's ERP session, and to use the transmitted data to update in the reference data 256.

Armed with a portable computing device 30, the customer 32 may proceed into the store to peruse the available goods and make their purchasing decisions. As the customer's ERP session continues, the routine 300 may pass to a block 308 wherein the customer 32 may input a request or otherwise execute a function provided by the customer access ERP application programs 254. The application programs 254 may provide a user interface at the device 30 including a series of menus and data entry screens allowing the customer 32 to select the desired function and to input the data necessary to execute the function. For example, a merchandise lookup function may provide a series of screens allowing the customer 32 to determine the availability of an item or a class of items that the customer 32 may be interested in purchasing. The screens may allow the customer 32 to enter information such as manufacture, brand, size, quantity and the like constituting the customer's selection criteria and execute the search to determine whether items matching the criteria are presently available at the store.

Once the customer 32 inputs the request, the device 30 may determine whether the request can be processed at the portable computing device 30 at a block 310. In the above example, where the customer 32 may be inquiring about merchandise available for sale at the store in which the customer 32 is shopping, the reference data 256 may include the data necessary for processing the request, such as item description and inventory information, and the application programs 254 may be configured to evaluate the customer search criteria and retrieve the corresponding information from the reference data 256. If the request can be processed at the portable computing device 30, control may pass to a block 312 wherein the portable computing device 30 executes the corresponding application program 254 to perform the requested function.

Alternatively, if the requested function is not performed solely by the application programs 254 of the portable computing device 30, control may pass a block 314 were in the portable computing device 30 formats and transmits a request message to the ERP system server 16 to process all or a portion of the request input by the customer 32 either at the ERP system server 16 or at other components of the back-office portion 12 of the ERP system 10. As previously discussed, the application programs 254 and reference data 256 stored at the portable computing devices 30 may be only that necessary to perform functions related to the particular store location. However, in a particular implementation the merchant may desire to give the customer 32 broader access to other information available in the ERP systems 10. For example, to avoid losing potential sales when items sought by the customer 32 are out of stock, the merchant may allow the customer's 32 to query the inventory of other store locations and warehouses to determine whether the items are readily available at such other locations. Instead of attempting to store all the inventory information for all the locations within the ERP systems 10 in the portable computing devices 30, the application programs 254 may be configured to request the inventory information from the ERP system server 16 at the time it is needed during a customer ERP session.

After the ERP system server 16 receives a request from the portable computing device 30, control may pass to a block 316 wherein the ERP system server 16 processes the request. In the present example, the ERP application programs 250 may be configured to retrieve the requested information from the ERP data system 250. For other ERP functions, the ERP application programs 250 may perform additional data processing, and may communicate with other devices of the ERP system 10 to perform distributed processing and/or obtain distributed system data. Once the request from the portable computing device 30 is processed by the ERP system server 16, control may pass to a block 318 wherein the ERP system server 16 formats and transmits a response message to the requesting portable computing device 30 containing the requested information. After the portable computing device 30 executes the application program 254 at block 312, or receives the response message transmitted by the ERP system server 16 at block 318, control may pass to a block 320 wherein the requested information is displayed at the portable computing device 30.

After the requested information is displayed at block 320, the customer 32 may have all the information necessary to complete their purchase or otherwise conclude their shopping experience at the store, or the customer 32 may wish to perform additional functions available at the portable computing device 30, such as searching for additional items of interest to the customer 32. If the customer 32 wishes to continue shopping and to further avail himself or herself of the customer access ERP functionality at a block 322, control may pass back to block 308 wherein the customer may input additional requests or execute additional customer access ERP functions. If the customer 32 is finished shopping at block 322, control may pass to a block 324 wherein the customer's ERP session may be concluded. Depending on the implementation, the customer 32 may proceed to a cashier to make a purchase, or the application programs 254 of the portable computing device 30 may be configured to allow the customer 32 to execute the purchase at the portable computing device 30. In the former implementation, the customer 32 may shut off the portable computing device 30, or provide the necessary input to indicate that the ERP session is concluding. In response, the portable computing device 30 may perform end of session processing, such as deleting customer-specific information and other transient session information that will not be needed when a new customer 32 initiates an ERP session at block 306. In the latter implementation, the customer 32 may be prompted to enter purchasing information, such as credit card billing information, and shipping information where the purchased items are to be delivered, that will be processed to complete the purchase transaction. Once the purchase is made, the portable computing device 30 may conclude the session in a similar manner as described above.

Figure 6:
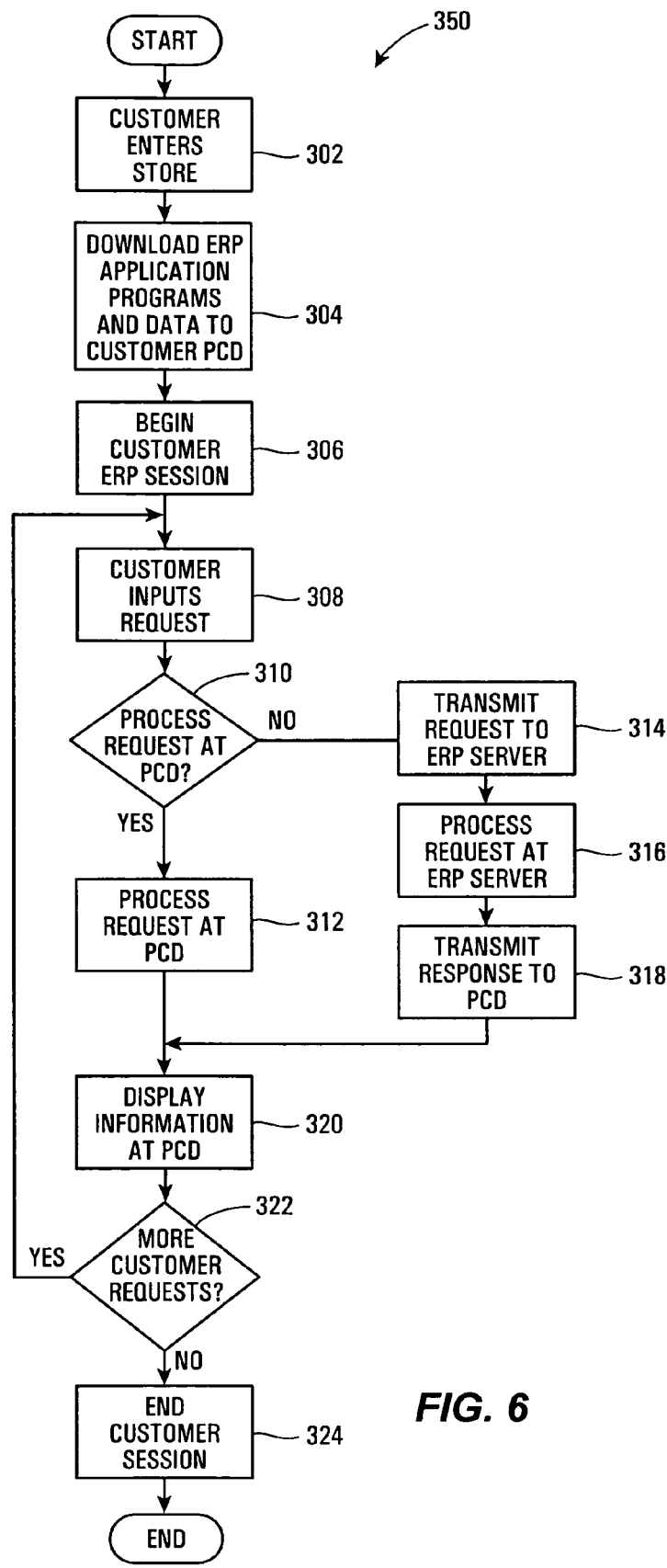
FIG. 6 is a flow diagram for a customer shopping routine for the merchant ERP system of FIG. 1 with customer-owned portable computing devices.

Whereas the routine 300 utilizes portable computing devices 30 provided by the merchant, the ERP system 10 may be implemented wherein the customer access ERP application programs 254 and reference data 256 are downloaded to customer-owned portable computing devices 30. FIG. 6 illustrates an exemplary process flow routine 350 for a customer's purchasing experience at a retail location wherein the customer access functionality is downloaded to customer-owned portable computing devices 30. Much of the functionality and flow previously described with respect to routine 300 of FIG. 5 occurs in a similar manner in routine 350 wherein similar blocks are identified using the reference numerals of FIG. 5. After the customer 32 enters the store at block 302, the customer access ERP application programs 254 and reference data 256 may be downloaded to the customer's portable computing device 30 at a block 352. The application programs 254 and reference data 256 may be downloaded from the ERP system server 16 via the communications interface 258 to the portable computing device 30 using any appropriate method for downloading and installing such information as is known in the art. In the illustrated routine 350, downloading of the customer access ERP application programs 254 occurs at the time the customer 32 enters the store. However, in some implementations the application programs 254 may be downloaded to the portable computing device 30 prior to the customer 32 entering the store. For example, the application programs 254 may have been downloaded during a customer's prior visit to the store, and may still be stored on the portable computing device 30. Still further, the application programs 254 may be provided via a download performed remotely from the physical facilities of the ERP system 10, such as through the merchant's Internet web site, or through a dial-up download where the portable computing device 30 is a cellular telephone. As a further alternative, the merchant may provide customers with a removable memory device, such as a RAM card or memory stick for a PDA device or a SIM card for a cellular telephone, having the direct customer access software loaded thereon.

With the application programs 254 loaded on the portable computing device 30, the customers ERP session may begin at block 306 in a similar manner as discussed above. Because the device 30 is customer-owned, you may be possible to store the user identification information requested at the beginning of the ERP session at the portable computing device 30 to reduce the amount of input necessary by the customer 32 in view of the more restrictive access to the information then would be provided with a merchant-supplied portable computing device 30. Once the session is initiated, the routine 350 may proceed in a similar manner with the customer 32 inputting one or more requests at the portable computing device 30 for the execution of the customer access ERP functions by blocks 308-322. When control passes to the end of the customer ERP session at block 324, the session may be terminated in a similar manner as described above. If the merchant desires, the customer access ERP application programs 254 may be retained in the memory 202 of the portable computing device 30 for use by the customer in subsequent ERP sessions. If not, the application programs 254 may be configured to uninstall themselves at the conclusion of the customer's ERP session at block 324.

Merchant ERP systems 10 implementing direct customer ERP access as described herein may be used in virtually any retail setting and may provide any level of functionality desired by the merchant to provide its customers with direct access, in a secure manner, to such ERP system information that may assist the customers during their shopping experience. For example, direct customer ERP access may be provided in a retail clothing store to obtain apparel items in the style, size and color desired by the customer. In such a retail clothing store without direct customer ERP access, the customer may need to depend on the availability of the sales associates in the store to obtain and purchase the desired clothing. A customer shopping for a pair of blue jeans may identify a style they wish to purchase, and search through the stacks of blue jeans in the display area but fail to find their size among the displayed pairs of jeans. If the customer is still interested in purchasing the blue jeans, the customer can make an inquiry with a sales associate, who may then search the same stacks to ensure that the customer did not miss a pair with the correct size, and then go to a point-of-sale terminal 20 to perform an inventory inquiry to determine whether any blue jeans of the correct size are in stock at the store. The sales associate may find that the jeans are in stock in the storeroom and bring a pair to the customer, or may find that the jeans are not in stock and return to tell the customer that the jeans are out of stock, and perhaps to inquire whether the customer wishes to place a backorder for the jeans or search for a pair at another store location. Depending on the customer's answer, the sales associate may return to the point-of-sale terminal 20 and placed a backorder for the jeans or search for the jeans at other store locations and, if the customer desires and the ERP system allows, request a store-to-store transfer of the jeans or place the jeans on temporary hold to allow the customer to go to the other store and purchase the jeans.

The same shopping scenario may be streamlined by providing access to similar functionality to the customer 32 at the portable computing device 30. When the customer 32 does not find the blue jeans in the correct size in the display area, the customer 32 may access an inventory lookup function on the portable computing device 30 by entering information for the style and size of the blue jeans at the touch screen 204, keyboard 206 or other input device of the portable computing device 30. Depending on the device 30, the customer 32 may be able to scan or read some or all of the information for the item from a bar code, RFID tag, or other identification device from which the device 30 is equipped to obtain information. If the blue jeans are available in the storeroom of the store, the customer 32 may be able to initiate a paging function wherein the device 30 may format and transmit a message to the ERP system server 16, a point-of-sale terminal 20, or other device of the ERP system 10 that may prompt a sales associate to retrieve the blue jeans for the customer. If the blue jeans are not available at the store, the device 30 may display an option for the customer 32 check the surrounding stores for inventory or to place the blue jeans on backorder. If the inventory inquiry function is selected by the customer 32, the device 30 may format and transmit an appropriate message to the ERP system server 16 to search the ERP system data 252 for availability of the blue jeans at surrounding store locations. In response, the ERP system server 16 may select the ERP system data 252 responsive to the request and transmit a response message back to a portable computing device 30. If inventory is available at other stores, the device 30 may further provide options for the customer 32 to place a time lock or hold on the blue jeans at another store, or to request a store-two-store transfer of the jeans. If either option is selected by the customer 32, the portable computing device 30 may format an additional message to the ERP system server 16 to update the information in the ERP system data 252 to reserve at the pair of blue jeans at the other store location and, if necessary, to process the store-to-store merchandise transfer transaction.

In another implementation, an ERP system 10 incorporating direct customer ERP access functionality may assist customers in furniture purchases. In traditional furniture stores, purchasing a chair may require that a customer go to the furniture store and talk to a sales associate about purchasing a chair. The sales associate may make a presentation in order to convince the customer to purchase a particular chair, but the customer would have little to no integration with the supply-chain for the furniture. Recently, stores like IKEA have introduced self-service to furniture shopping and put some of the actual production (final assembly) upon the customer. In many instances, the customer can find and retrieve the boxed-up furniture item from the shelves, and need only involve the sales associate to complete the purchase of the piece of furniture.

The customer purchasing process may be further streamlined by providing direct customer ERP access to functionality similar to that described above in the clothing store example. Upon entering the store, the customer 32 may receive a merchant-supplied portable computing device 30 or have the option of downloading the direct customer ERP software onto their phone, MP3 player or similar device. The customer 32 may proceed to the display area for the available chairs and pick one out for purchase. After making the decision, the customer 32 may scan or otherwise read a barcode, RFID tag, or similar identification device affixed to the display model of the chair, and have the device 30 display the location of the boxed-up chair on the storage shelves. If the chair is in stock, the direct customer ERP application programs 254 may be configured to display a list of options to the customer on the display 204 of the device 30, such as "Add item to shopping cart," "See what other people purchased with this item," "See related items," and "Proceed to checkout." Selecting the first option may add the chair to a list of items that the customer 32 has indicated will be purchased at the conclusion of the ERP session. Selecting the second or third options may cause the customer access ERP application programs 254 to select information stored as preference data 256 or in the ERP system data 252 for the items corresponding to the customer's selection. Selection of the fourth option may cause the portable computing device 32 begin executing a purchasing function wherein the customer 32 may input the necessary billing information to complete their furniture purchasing transaction.

In a further exemplary implementation of an ERP system 10 incorporating direct customer ERP access, a customer 32 at a discount shoe store may be given access to the ERP system 10 to search the available inventory for shoes at the customer 32 may be interested in purchasing. When the customer 32 enters the shoe store and begins other ERP session at block 306 of routine 300 or 350, the customer access ERP application programs 254 may cause the device 30 to display an inventory search function wherein the customer 32 may enter search criteria such as manufacturer name, brand, style, color, size and the like and initiate a search of the reference data 256 for in-stock shoes meeting the customer search criteria. After selecting records meeting the customer's search criteria, the application programs 254 may display the retrieved information at the display tool four of the device 30, possibly including the display location within the shoe store where the shoes may be found. To further assist the customer 32 and possibly save the customer 32 time and browsing the available shoes, the customer 32 may be able to select one or more of the retrieved shoes and have an image stored in the reference data 256 or retrieved from the ERP system data 252 displayed at the portable computing device 30. Still further, the customer 32 may be provided with additional options related to their search request and corresponding output, such as initiating additional searching for shoes that closely but do not identically match the search criteria, and retrieving additional items offered by a shoe store that are accessories to or are frequently purchased with shoes matching the customer-entered search to you. Moreover, the customers of the shoe store may be offered additional direct customer access ERP functionality similar the two that discussed in a preceding clothing store and furniture store examples, such as searching for inventory at other store and warehouse locations, back ordering a particular pair of shoes, and the like.

Those skilled in the art will understand that the clothing store, furniture store and shoe store implementations discussed herein are exemplary only. Direct customer ERP access as described herein to information and functionality of backend business logic handling systems may be implemented in other areas where such access to those systems has heretofore been limited to authorized employees and not available to customers in general. A further example includes integration of direct customer access can sit down and fast food restaurants to allow customers to order meals, inquire regarding menu items and specials, to request refills or other assistance, and to perform other functions normally performed by the restaurant employees. Direct customer ERP access may serve to empower the customers during their shopping experience and facilitate purchasing of the merchant's goods and services by allow the customers to be free in their shopping by being able to personally handle many of the simpler ERP-related tasks via the personal computing device 30 having the direct customer ERP access functionality loaded thereon.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method for providing direct access by a customer of a merchant of goods or services to functions and data available in the merchant's business logic handling system, comprising:
   installing functions of the business logic handling system at a portable computing device;
   downloading to the portable computing device data of the business logic handling system corresponding to the functions installed at the portable computing device and to items offered for sale by the merchant;
   receiving a request input by the customer at the portable computing device to perform a function of the business logic handling system installed at the portable computing device;
   executing the function of the business logic handling system requested by the customer at the portable computing device; and
   displaying an output of the executed function of the business logic handling system at the portable computing device.

2. The method of claim 1, further comprising:
   determining at the portable computing device that the function requested by the customer is executed by a system server of the business logic handling system;
   transmitting a request message from the portable computing device to the system server to perform the function requested by the customer;
   executing the function requested by the customer at the system server;
   transmitting a response message from the system server to the portable computing device containing an output of the function executed by the system server; and
   displaying the output from the response message at the portable computing device.

3. The method of claim 1, further comprising:
   transmitting a request from the portable computing device to a system server of the business logic handling system for current data of the business logic handling system corresponding to the functions installed at the portable computing device;
   receiving the request for current data at the system server;
   selecting the requested current data from system data stored remotely from the portable computing device;

transmitting a response message containing the selected current data from the system server to the portable computing device;

receiving the response message at the portable computing device; and updating the data stored at the portable computing device with the selected current data from the response message.

4. The method of claim 1, further comprising:

periodically transmitting data update messages containing current data of the business logic handling system corresponding to the functions installed at the portable computing device from a system server of the business logic handling system having access to the system data;

receiving the data update messages at the portable computing device; and updating the data stored at the portable computing device with the current data from the data update messages.

5. The method of claim 1, further comprising:

installing an inventory inquiry function at the portable computing device;

downloading item information and inventory information for items offered for sale by the merchant to the portable computing device;

receiving an item inventory inquiry request for an item at the portable computing device;

selecting item information and inventory information for the requested item in response to receiving the item inventory inquiry request at the portable computing device; and displaying the selected item information and inventory information at the portable computing device.

6. The method of claim 5, wherein the merchant has a plurality of retail locations, and wherein the item information and inventory information downloaded to the portable computing device corresponds to the retail location at which the portable computing device is disposed, the method further comprising:

installing an inventory inquiry function at the portable computing device for requesting inventory information for retail locations other than the retail location at which the portable computing device is disposed;

receiving an item inventory inquiry request for inventory information for a retail location other than the retail location at which the portable computing devices is disposed;

transmitting a request message from the portable computing device to a system server of the business logic handling system containing the item inventory inquiry request;

selecting at the system server inventory information from system data for the requested item for the retail location other than the retail location at which the portable computing device is disposed in response to receiving the item inventory inquiry request message at the system server;

transmitting a response message from the system server to the portable computing device containing the selected inventory information; and displaying the selected inventory information from the response message at the portable computing device.

7. The method of claim 6, further comprising:

installing an item reservation function at the portable computing device for reserving inventory at a retail location other than the retail location at which the portable computing device is disposed;

receiving an item reservation request for an item at a retail location other than the retail location at which the portable computing devices is disposed;

transmitting a request message from the portable computing device to the system server containing the item reservation request;

receiving the request message at the system server; and updating the system data to reserve the requested item at the retail location other than the retail location at which the portable computing device is disposed in response to receiving the item reservation request message at the system server.

8. The method of claim 1, further comprising:

installing an item purchasing function at the portable computing device;

receiving an item purchase request at the portable computing device;

transmitting an item purchase message containing the item purchase request from the portable computing device to a system server for the business logic handling system;

receiving the item purchase message at the system server; and updating system data accessible by the system server to reduce the inventory of the purchased item by a quantity indicated in the item purchase message in response to receiving the item purchase message at the system server.

9. A method for providing direct access by a customer of a merchant of goods or services to functions and data available in the merchant's business logic handling system, comprising:

downloading functions of the business logic handling system to a portable computing device owned by the customer;

downloading to the portable computing device data of the business logic handling system corresponding to the functions installed at the portable computing device and to items offered for sale by the merchant;

receiving a request input by the customer at the portable computing device to perform a function of the business handling system installed at the portable computing device;

executing the function of the business handling system requested by the customer at the portable computing device; and displaying an output of the executed function of the business handling system at the portable computing device.

10. The method of claim 9, further comprising:

determining at the portable computing device that the function requested by the customer is executed by a system server of the business logic handling system;

transmitting a request message from the portable computing device to the system server to perform the function requested by the customer;

executing the function requested by the customer at the system server;

transmitting a response message from the system server to the portable computing device containing an output of the function executed by the system server; and displaying the output from the response message at the portable computing device.

11. The method of claim 9, further comprising:

installing an inventory inquiry function at the portable computing device;

downloading item information and inventory information for items offered for sale by the merchant to the portable computing device;

receiving an item inventory inquiry request for an item at the portable computing device;

selecting item information and inventory information for the requested item in response to receiving the item inventory inquiry request at the portable computing device; and displaying the selected item information and inventory information at the portable computing device.

12. The method of claim 11, wherein the merchant has a plurality of retail locations, and wherein the item information and inventory information downloaded to the portable computing device corresponds to the retail location at which the portable computing device is disposed, the method further comprising:

installing an inventory inquiry function at the portable computing device for requesting inventory information for retail locations other than the retail location at which the portable computing device is disposed;

receiving an item inventory inquiry request for inventory information for a retail location other than the retail location at which the portable computing devices is disposed;

transmitting a request message from the portable computing device to a system server of the business logic handling system containing the item inventory inquiry request;

selecting at the system server inventory information from system data for the requested item for the retail location other than the retail location at which the portable computing device is disposed in response to receiving the item inventory inquiry request message at the system server;

transmitting a response message from the system server to the portable computing device containing the selected inventory information; and displaying the selected inventory information from the response message at the portable computing device.

13. The method of claim 12, further comprising:

installing an item reservation function at the portable computing device for reserving inventory at a retail location other than the retail location at which the portable computing device is disposed;

receiving an item reservation request for an item at a retail location other than the retail location at which the portable computing devices is disposed;

transmitting a request message from the portable computing device to the system server containing the item reservation request;

receiving the request message at the system server; and updating the system data to reserve the requested item at the retail location other than the retail location at which the portable computing device is disposed in response to receiving the item reservation request message at the system server.

14. The method of claim 9, further comprising:

installing an item purchasing function at the portable computing device;

receiving an item purchase request at the portable computing device;

transmitting an item purchase message containing the item purchase request from the portable computing device to a system server for the business logic handling system;

receiving the item purchase message at the system server; and updating system data accessible by the system server to reduce the inventory of the purchased item by a quantity indicated in the item purchase message in response to receiving the item purchase message at the system server.

15. A computer readable medium with computer executable instructions for a business logic handling system providing direct access by a non-employee to functions and information of the business logic handling system of a merchant of goods or services, the computer executable instructions comprising instructions for:

installing functions of the business logic handling system on a portable computer device;

downloading to the portable computing device data of the business logic handling system corresponding to the functions installed at the portable computing device and to items offered for sale by the merchant;

receiving a request input by the non-employee at the portable computing device to perform a function of the business logic handling system installed at the portable computing device;

executing the function of the business logic handling system requested by the non-employee at the portable computing device; and displaying an output of the executed function of the business logic handling system at the portable computing device.

16. The computer readable medium of claim 15, further comprising computer executable instructions for:

determining at the portable computing device that the function requested by the customer is executed by a system server of the business logic handling system;

transmitting a request message from the portable computing device to the system server to perform the function requested by the customer;

executing the function requested by the customer at the system server;

transmitting a response message from the system server to the portable computing device containing an output of the function executed by the system server; and displaying the output from the response message at the portable computing device.

17. The computer readable medium of claim 15, further comprising computer executable instructions for:

installing an inventory inquiry function at the portable computing device;

downloading item information and inventory information for items offered for sale by the merchant to the portable computing device;

receiving an item inventory inquiry request for an item at the portable computing device;

selecting item information and inventory information for the requested item in response to receiving the item inventory inquiry request at the portable computing device; and displaying the selected item information and inventory information at the portable computing device.

18. The computer readable medium of claim 17, wherein the business logic handling system is configured for implementation for a plurality of retail locations, and wherein the item information and inventory information downloaded to the portable computing device corresponds to the retail location at which the portable computing device is disposed, further comprising computer executable instructions for:

installing an inventory inquiry function at the portable computing device for requesting inventory information for retail locations other than the retail location at which the portable computing device is disposed;

receiving an item inventory inquiry request for inventory information for a retail location other than the retail location at which the portable computing devices is disposed;
transmitting a request message from the portable computing device to a system server of the business logic handling system containing the item inventory inquiry request;
selecting at the system server inventory information from system data for the requested item for the retail location other than the retail location at which the portable computing device is disposed in response to receiving the item inventory inquiry request message at the system server;
transmitting a response message from the system server to the portable computing device containing the selected inventory information; and
displaying the selected inventory information from the response message at the portable computing device.

19. The computer readable medium of claim 18, further comprising computer executable instructions for:
installing an item reservation function at the portable computing device for reserving inventory at a retail location other than the retail location at which the portable computing device is disposed;
receiving an item reservation request for an item at a retail location other than the retail location at which the portable computing devices is disposed;
transmitting a request message from the portable computing device to the system server containing the item reservation request;
receiving the request message at the system server; and
updating the system data to reserve the requested item at the retail location other than the retail location at which the portable computing device is disposed in response to receiving the item reservation request message at the system server.

20. The computer readable medium of claim 15, further comprising computer executable instructions for:
installing an item purchasing function at the portable computing device;
receiving an item purchase request at the portable computing device;
transmitting an item purchase message containing the item purchase request from the portable computing device to a system server for the business logic handling system;
receiving the item purchase message at the system server; and
updating system data accessible by the system server to reduce the inventory of the purchased item by a quantity indicated in the item purchase message in response to receiving the item purchase message at the system server.

* * * * *